United States Patent
Mohs et al.

(10) Patent No.: US 10,767,460 B2
(45) Date of Patent: Sep. 8, 2020

(54) METHOD OF CHEMICALLY DELAYING PEROXYGEN BASED VISCOSITY REDUCTION REACTIONS

(71) Applicant: Orin Technologies, LLC, Verona, WI (US)

(72) Inventors: Adam Mohs, Sartell, MN (US); Marc Baures, Ettrick, WI (US); Larry Kinsman, Verona, WI (US)

(73) Assignee: Orin Technologies, LLC, Verona, WI (US)

( * ) Notice: Subject to any disclaimer, the term of this patent is extended or adjusted under 35 U.S.C. 154(b) by 0 days.

(21) Appl. No.: 15/696,379

(22) Filed: Sep. 6, 2017

(65) Prior Publication Data

US 2017/0362924 A1    Dec. 21, 2017

Related U.S. Application Data

(63) Continuation of application No. 14/670,720, filed on Mar. 27, 2015, now Pat. No. 9,771,782.

(60) Provisional application No. 61/971,698, filed on Mar. 28, 2014.

(51) Int. Cl.
| | |
|---|---|
| E21B 43/25 | (2006.01) |
| C09K 8/03 | (2006.01) |
| C09K 8/52 | (2006.01) |
| C09K 8/62 | (2006.01) |
| C09K 8/50 | (2006.01) |

(52) U.S. Cl.
CPC ............ *E21B 43/25* (2013.01); *C09K 8/03* (2013.01); *C09K 8/52* (2013.01); *C09K 8/62* (2013.01); *C09K 8/50* (2013.01); *C09K 2208/26* (2013.01); *C09K 2208/28* (2013.01)

(58) Field of Classification Search
CPC .......... E21B 43/16; E21B 43/26; E21B 43/25; C09K 8/03; C09K 8/52; C09K 8/62; C09K 8/50; C09K 2208/26; C09K 2208/28
See application file for complete search history.

(56) References Cited

U.S. PATENT DOCUMENTS

| | | |
|---|---|---|
| 1,958,204 A | 5/1934 | Reichert |
| 3,607,053 A | 9/1971 | Reilly |
| 3,865,628 A | 2/1975 | Callahan et al. |
| 4,144,179 A | 3/1979 | Chatterji |
| 4,250,044 A | 2/1981 | Hinkel |

(Continued)

FOREIGN PATENT DOCUMENTS

WO    9954258    10/2013

OTHER PUBLICATIONS

Wikipedia, Drilling Fluid, http://en.wikipedia.org/wiki/Drilling_fluid.

(Continued)

*Primary Examiner* — Silvana C Runyan
(74) *Attorney, Agent, or Firm* — Boyle Frederickson, S.C.

(57) ABSTRACT

A method of time delayed reduction in the molecular weight of polymers in a viscosified fluid and a method of time delayed breaking of viscosified fluids through treatment of the viscosified fluid with a viscosity breaking composition. The viscosity breaking composition is formed from a peroxygen compound, a peroxygen inhibiting agent and a peroxygen catalyzing agent, where the relative concentration of the components determines the duration of the a time interval require for breaking the viscosified fluid.

13 Claims, 8 Drawing Sheets

(56) References Cited

U.S. PATENT DOCUMENTS

| | | | |
|---|---|---|---|
| 4,434,069 A | | 2/1984 | Fairchild |
| 5,055,139 A | | 10/1991 | Personette |
| 5,238,065 A | * | 8/1993 | Mondshine .............. C09K 8/52 |
| | | | 166/300 |
| 5,314,022 A | | 5/1994 | Cowan et al. |
| 5,330,581 A | | 7/1994 | Syrinek |
| 5,430,237 A | | 7/1995 | Sharp |
| 5,556,832 A | * | 9/1996 | Van Slyke .............. C09K 8/32 |
| | | | 507/203 |
| 5,624,886 A | | 4/1997 | Dawson et al. |
| 5,741,427 A | | 4/1998 | Watts et al. |
| 6,602,181 B2 | | 8/2003 | Quintero et al. |
| 6,668,947 B2 | | 12/2003 | Cordova |
| 6,695,077 B2 | | 2/2004 | Szyrnocha et al. |
| 6,797,675 B2 | | 9/2004 | Von Krosigk |
| 7,361,280 B2 | | 4/2008 | Baker |
| 7,524,141 B2 | | 4/2009 | Seth et al. |
| 7,621,335 B2 | | 11/2009 | Valerian et al. |
| 7,662,294 B1 | | 2/2010 | Cox |
| 7,712,535 B2 | | 5/2010 | Venditto et al. |
| 7,745,680 B1 | | 6/2010 | Cox |
| 7,923,417 B2 | | 4/2011 | Sanders et al. |
| 8,367,589 B2 | | 2/2013 | Li et al. |
| 8,480,903 B1 | | 7/2013 | Taylor |
| 9,562,188 B2 | | 2/2017 | Monroe et al. |
| 2007/0053748 A1 | | 3/2007 | Luthy et al. |
| 2007/0135310 A1 | * | 6/2007 | Qu .......................... C09K 8/52 |
| | | | 507/90 |
| 2007/0265171 A1 | * | 11/2007 | Javora ..................... C09K 8/52 |
| | | | 507/90 |
| 2011/0259592 A1 | | 10/2011 | Reyes |
| 2013/0168095 A1 | | 7/2013 | Loveless et al. |
| 2013/0213657 A1 | | 8/2013 | Dobson, Jr. et al. |
| 2013/0248461 A1 | | 9/2013 | Pisanova et al. |

OTHER PUBLICATIONS

PetroWiki, Society of Petroleum Engineers, Drilling Fluid Types, Sep. 12, 2013, http://petrowiki.org/Drilling_fluid_types.

Argonne National Laboratory, Drilling Waste Management Technology Descriptions, http://web.ead.anl.gov/dwm/techdesc/index.cfm.

Environmental Protection Agency, Paint Filter Liquids Test Method 9095B, Nov. 2004, http://www.epa.gov/osw/hazard/testmethods/sw846/pdfs/9095b.pdf.

Bian, R. et al., "A three-year experiment confirms continuous immobilization of cadmium and lead in contaminated paddy field with biochar amendment", Journal of Hazardous Materials 272 (2014) 121-128.

Fellet, G. et al., "Application of Biochar on Mine Tailings: Effects and Perspective for Land Reclamation", Chemosphere 83 (2011) 1262-1267.

Kelly, C. N. et al., "Biochar application to hardrock mine tailings: Soil quality, microbial activity, and toxic element sorption", Applied Geochemistry 43 (2014) 35-48.

Oh, S.Y. et al., "Biochar for Treating Acid Mine Drainage", Environmental Engineering Science., vol. 30, No. 10, 2013.

Tang, J. et al., "Characteristics of biochar and its application in remediation of contaminated soil", Journal of Bioscience and Bioengineering, vol. 116, Issue 6, 653-659, 2013.

Yu, J.J. et al., "Contaminated Site Remedial Investigation and Feasibility Removal of Chlorinated Volitile Organic Compounds from Groundwater by Activated Carbon Fiber Adsorption", Chemosphere 41 (2000) 371-378.

Lassiter, E. et al., "Denitrifying Bioreactors: An Emerging Best Management Practice to Improve Water Quality", Virginia Cooperative Extension, Communication and Marketing, College of Agriculture and Life Sciences, Virginia Polytechnic Institute and State University, vols. BSE-55P, 2013.

Wujcik, W.J. et al., "Granular Activated Carbon Pilot Treatment Studies for Explosives Removal from Contaminated Groundwater", Environmental Progress (vol. 11, No. 3), Aug. 1992.

Hipp, J.A. et al., "Optimization of Stormwater Filtration at the Urban/Watershed Interface", Environ. Sci. Technol. 2006, 40, 4794-4801.

Sneath, H. et al., "Remediation of Metal, Arsenic and Phenanthrene Contaminated Soil Using Charcoal and Iron Filings", Goldschmidt Conferecne Abstracts 2009.

Han I. et al., "Removal of Hexavalent Chromium from Groundwater by Granular Activated Carbon", Water Environment Research, vol. 72, No. 1, 2000.

McKinnon, R.J. et al., "Removing Organics from Groundwater Through Aeration Plus GAC", Journal of American Water Works Association, vol. 76, Issue 5, 1984.

Edwards, A. C. et al., "Soil phosphorus management and water quality: a UK perspective", Soil Use and Management (1998) 14, 124-130.

Beaton, J.D. et al., "Some Aspects of Phosphate Adsorption by Charcoal", Soil Science Society of America, Proceedings, vol. 24, 1960.

Zheng, Z. et al., "Sorption of ammonium and phosphate from aqueous solution by biochar derived from phytoremediation plants", J Zhejiang Univ-Sci B (Biomed & Biotechnol) 2013 14(12):1152-1162.

Parette, R. et al., "The removal of perchlorate from groundwater by activated carbon tailored with cationic surfactants", Water Research, 39 (2005) 4020-4028.

Zhang, X. et al., "Using biochar for remediation of soils contaminated with heavy metals and organic pollutants", Environ Sci Pollut Res, vol. 20, Issue 12, 2013.

* cited by examiner

METHOD OF CHEMICALLY DELAYING PEROXYGEN BASED VISCOSITY REDUCTION REACTIONS

CROSS-REFERENCE TO RELATED APPLICATIONS

This application is a continuation of U.S. nonprovisional patent application Ser. No. 14/670,720 filed Mar. 27, 2015, which claims priority to U.S. provisional patent application Ser. No. 61/971,698, filed Mar. 28, 2014, the entire contents of which are incorporated herein by reference.

BACKGROUND OF THE INVENTION

1. Technical Field

The present invention relates to a method of reducing the viscosity and/or overall molecular weight of viscosified fluids to a desired value in subsurface hydraulic fracturing through the administration of a time delayed breaker composition.

More specifically, the present invention describes a method and composition for reducing the viscosity and/or overall molecular weight of viscosified fluids to a desired value in subsurface hydraulic fracturing through the administration of a time delayed breaker composition including water, a peroxygen, a peroxygen inhibitor, and a peroxygen activator.

2. Background Art

Hydraulic fracturing is a well-stimulation technique in which subsurface rock formations are fractured by the introduction of a hydraulically pressurized liquid. As a result of the cracks or fractures that are formed in rock formations, natural gas and/or petroleum flow and extraction from a well may be increased. Additional solid material additive components, commonly referred to as hydraulic fracturing proppants, may also be added to the hydraulic fracturing fluid to hold the fractures open.

Various form of hydraulically pressurized liquid are currently used, including viscosified fluids such as slick water, linear gels and cross-linked gels. While such viscous fluids are capable of carrying more concentrated proppant into subsurface rock formations, these viscofied fluids do present various drawbacks. One shortcoming regarding the use of viscosified fluids for stimulation and fracturing applications is the difficulty in effectively removing or extracting the viscofied fluid from the formation without removing the proppant from the fractures. Prior attempts to remove the viscosified hydraulic fracturing fluids have included the introduction of chemicals to reduce the viscosity of the fracturing fluids, commonly known as breakers. Examples of such break systems include the use of oxidative chemistries in various forms, as well as other methods that utilize chelants, surfactants, etc. However, many of these oxidative breaker systems do not achieve the desired degree of reduction in fluid viscosity and/or the desired degree of reduction in polymer molecular weight. Additionally, many of these prior oxidative breaker systems cannot perform the desired reduction in fluid viscosity and/or the desired reduction in polymer molecular weight in a delayed manner.

In order to increase the efficiency of oxidants used for breaking viscosified fluids various catalytic agents have been employed for the purposes of decreasing reaction time and free radical generation.

Despite these advancements, it is still desirable to overcome these shortcomings to reduce the viscosity of such viscosified hydraulic fluids and/or reduce the molecular weight of the water soluble polymers within such fluids to desired levels within a specific timeframe in which the fluids can be both pumped down hole and the formation stimulation completed.

SUMMARY OF THE INVENTION

In one embodiment, the present invention provides a method of delaying peroxygen based viscosity and/or molecular weight reduction reactions of viscosified fluids, for example, hydraulic fracturing fluids, through the use of specific reaction inhibitors in varying concentrations to achieve a desired break time. As used herein the terms "viscous" and "viscosified fluids" may include fluids exhibiting a viscosity higher than water, as well as fluids that contain viscosifers or viscosifying additives such as polymer, gaur gum, xanthan gum, etc. Examples of viscous or viscosified fluids in accordance with the present invention include, but are not limited to slick water, hydraulic fracturing fluid, gel sweep fluid, friction reducing fluid, drilling fluid, road bed stabilization fluid, water shut-off fluid, filter cake, etc.

The ability to delay a viscosity break and/or molecular weight reduction for a specific period of time is desirable because the delay allows the hydraulic fracturing fluids to reach specific zones of the formation to be hydraulically fractured while maintaining any number of desirable characteristics offered by relatively higher viscosities and/or higher molecular weight, such as friction reduction, proppant suspension, or formation isolation in formation remediation activities. Furthermore, the ability to delay the viscosity and/or molecular weight reduction is desirable to allow related operations at the well's surface to proceed more efficiently and orderly without the need to act in a hurried manner.

Thus it is one object of the invention to provide a method of breaking viscosified fluids in an underground formation that may include the steps of: treating a viscosified fluid with a viscosity breaking composition to provide a time delayed reduction of viscosity of the viscosified fluid occurring over a predetermined interval of time resulting in a reduced viscosity fluid; before expiration of the predetermined interval of time, introducing the viscosified fluid treated with the viscosity breaking composition into an underground formation; and over the predetermined interval of time, converting the viscosified fluid to a reduced viscosity fluid having a viscosity lower than the viscosified fluid.

The method of breaking the viscofied fluid may also include reducing the molecular weight of polymers contained within the viscofied fluids.

Thus it is another object of the invention to provide a method of reducing a molecular weight of polymers in a first fluid that may include the steps of: treating the first fluid with a molecular weight reducing composition to provide a time delayed average molecular weight reduction of the polymers in the first fluid occurring over a predetermined interval of time; before expiration of the predetermined interval of time, introducing the first fluid treated with the molecular weight reducing composition into an underground formation; and during the predetermined interval of time, reducing the average molecular weight of the polymers in the first fluid to form a second fluid comprising polymers of a reduced average molecular weight relative to the polymers in the first fluid.

The present invention may also provide a composition for the delayed breaking of a viscofied fluid that includes in-part target ratios of a first volume of a peroxygen compound selected from a group consisting of organic peroxides, inorganic peroxides, persulfate salts, percarbonate salts, perborate salts, and combinations thereof; and a second volume of a peroxygen inhibiting agent selected from a group consisting of phosphoric acid, stannic acid, stannate, nitrates, organophosphates, phosphate salts and combinations thereof.

In one object of the invention, a relative ratio of the first volume of a peroxygen compound and second volume of a peroxygen inhibiting agent may determine a time delay for reducing the molecular weight of polymers in a viscosified fluid after introducing the composition to the viscosified fluid.

In one object of the invention, a relative ratio of the first volume of a peroxygen compound and second volume of a peroxygen inhibiting agent may determine a time delay for reducing the viscosity of a viscosified fluid after introducing the composition to the viscosified fluid.

The first volume of the peroxygen compound in the composition may be selected from a group consisting of tert-butyl peroxide, peracetic acid, benzoyl peroxide, cumene hydroperoxide, hydrogen peroxide, sodium peroxide, magnesium peroxide, calcium peroxide, assodium persulfate, potassium persulfate, ammonium persulfate, sodium peroxymonosulfate, potassium peroxymonosulfate, sodium percarbonate, sodium perborate and combination thereof.

The second volume of the peroxygen inhibiting agent in the composition may selected from a group consisting of sodium stannate, potassium stannate, calcium stannate, ammonium nitrate, sodium nitrate, potassium nitrate, trisodium phosphate, sodium phosphate dibasic, sodium tripolyphosphate, and combination thereof.

Additionally, it is another object of the invention to include a peroxygen catalyzing agent in the composition for the delayed breaking of a viscofied fluid. The peroxygen catalyzing agent may be selected from a group consisting of transition metals, transition metal salts, chelated transition metal, and combinations thereof; and wherein the When a peroxygen catalyzing agent is included in the composition, the relative ratio of peroxygen catalyzing agent to the volume of a viscosified fluid may determine the time delay for reducing the molecular weight of polymers in the viscosified fluid after introducing the viscosity breaking composition to the viscosified fluid.

The relative ratio of peroxygen catalyzing agent to the volume of a viscosified fluid may also determine the time delay for reducing the viscosity of the viscosified fluid after introducing the viscosity breaking composition to the viscosified fluid.

In another object of the invention, ratios of the three components, namely, the peroxygen compound, peroxygen inhibiting agent and peroxygen catalyzing agent may be manipulated such that the breaking time, i.e. predetermined interval of time, may be adjusted to better suit a desired break time. The desired break time may be dependent upon the volume of viscosified fluid, the speed at which the viscosified fluid is pumped, the desired delay between the cessation of hydraulic fracturing (stimulation) and flow back beginning, or any other number of operations requiring a delay in the reduction of the viscosity and/or molecular weight of the high viscosity fluid being pumped.

The viscofied fluid breaking method and related composition may use between 0.1% and 70.0% by weight of the peroxygen compound relative to a mixture of the peroxygen compound and the peroxygen inhibiting agent.

The viscofied fluid breaking method and related composition may use between 0.5% and 10.0% by weight of the peroxygen inhibiting agent relative to a mixture of the peroxygen compound and the peroxygen inhibiting agent.

The viscofied fluid breaking method and related composition may use between 0.0001% and 5.0% by weight of the peroxygen catalyzing agent relative to a volume of the viscosified fluid into which the composition is added.

The viscofied fluid breaking method and related composition may reduce the viscosity of the viscofied fluid to less than 2 centipoises.

It is thus another object of the invention to provide a viscosity breaking method and composition the viscosity of the viscosified is greater than 7 centipoise at 25° C. and the viscosity of the reduced viscosity fluid is less than 2 centipoise at 25° C.

The viscofied fluid breaking method and related composition may delay the breaking of the fluid viscofied fluid such that the break occurs in more than 15 minutes and less than 1,440 minutes.

It is thus another object of the invention to provide a viscosity breaking method and composition wherein a predetermined interval of time in which the fluid break occurs falls within a range between 15 minutes and 1,440 minutes.

The viscofied fluid breaking method and related composition may delay the breaking of the fluid viscofied fluid such that the break occurs in less than 2,880 minutes.

It is thus another object of the invention to provide a viscosity breaking method and composition wherein a predetermined interval of time in which the fluid break occurs falls within a range between 1.0 minute and 2,880 minutes.

The viscofied fluid breaking method and related composition may reduce the viscosity of the viscofied fluid by at least 10%.

It is thus another object of the invention to provide a viscosity breaking method and composition wherein the viscosity of the reduced viscosity fluid is at least 10% lower than the viscosity of the viscosified fluid.

The viscofied fluid breaking method and related composition may reduce the viscosity of the viscofied fluid by at least 50%.

It is thus another object of the invention to provide a viscosity breaking method and composition wherein the viscosity of the reduced viscosity fluid is at least 50% lower than the viscosity of the viscosified fluid.

The molecular weight reducing method and related composition may reduce the average molecular weight of polymers in the fluid by at least 1,000 Atomic maSS units ("AMU").

It is thus another object of the invention to provide a molecular weight reduction method and composition wherein an average molecular weight of polymers in the fluid may be between 1,000 AMU and $1\times10^8$ AMU, and wherein an average molecular weight of polymers in the resultant fluid is between 900 AMU and $1\times10^7$ AMU, after breaking the first fluid with the composition.

The molecular weight reducing method and related composition may reduce the average molecular weight of polymers in the fluid to which the composition is added by at least 5%.

It is thus yet another object of the invention to provide a molecular weight reducing method and composition wherein the viscosity of the average molecular weight of the polymers in the resultant second fluid is at least 5% lower than the average molecular weight of the polymers in the initial first fluid.

The molecular weight reducing method and related composition may reduce the average molecular weight of polymers in the fluid to which the composition is added by at least 50%.

It is thus another object of the invention to provide a molecular weight reducing method and composition wherein the viscosity of the average molecular weight of the polymers in the resultant second fluid is at least 50% lower than the average molecular weight of the polymers in the initial first fluid The viscofied fluid breaking method and related composition may be applied to a viscosified fluid including but not limited to slick water, hydraulic fracturing fluid, gel sweep fluid, friction reducing fluid, drilling fluid, road bed stabilization fluid, water shut-off fluid, filter cake.

It is thus another object of the invention to provide a viscofied fluid breaking method and related composition to be applied to a viscosified fluid selected from a group including slick water, hydraulic fracturing fluid, gel sweep fluid, friction reducing fluid, drilling fluid, road bed stabilization fluid, water shut-off fluid, filter cake and combinations thereof.

Further aspects or embodiments of the present invention will become apparent from the ensuing description which is given by way of example only.

DETAILED DESCRIPTION

Figure 1:
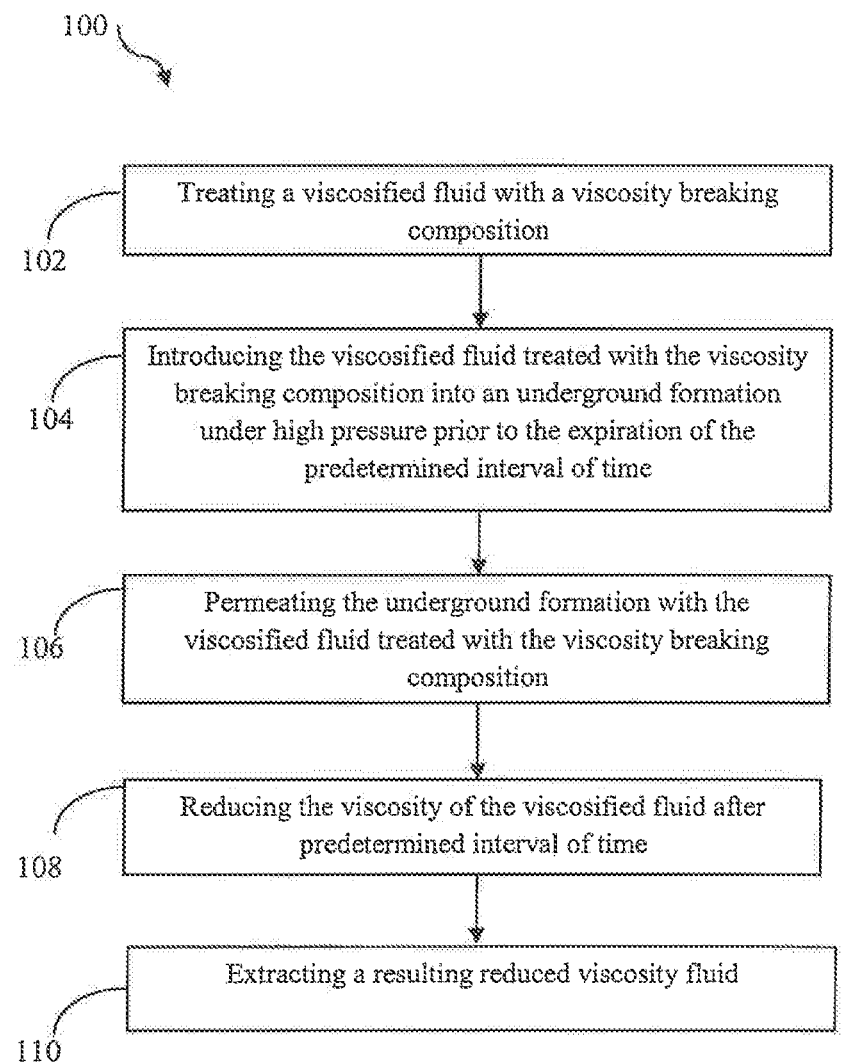
FIG. 1 is a flow chart showing the steps of a method of breaking a viscosified fluid according to one embodiment of the present invention.

Referring first to FIG. 1, a method 100 is shown for reducing the viscosity of a viscosified fluid, i.e., breaking the viscosified fluid, in accordance with one embodiment of the present invention. For example, the viscofied fluid may be a viscosified fluid such as slick water, linear gels, or cross-linked gels, which are commonly used in drilling operations such as hydraulic fracturing; however, other applications are considered well within the scope of this invention. The first step of the method 100 is to treat the viscofied fluid with a viscosity breaking composition, shown at block 102. In one embodiment, the viscosity breaking composition may include a peroxygen compound, a peroxygen inhibitor and a peroxygen catalyzing agent, as will be described in further detail below. In the drilling application, the viscofied fluid that has been treated with the viscosity breaking composition is then introduced underground at a high pressure prior to the expiration of a predetermined interval of time, at block 104. In some embodiments of the present invention, such as when used in hydraulic fracturing, the viscofied fluid that has been treated with the viscosity breaking composition permeates an underground formation, as shown at block 106, after being introduced underground. Alternatively, in other drilling operations, such as performing gel sweeps, the viscofied fluid that has been treated with the viscosity breaking composition may permeate a relatively smaller underground area at or near the region of a wellbore. At subsequent block 108, the viscosity breaking composition reduces the viscosity, i.e., breaks, the viscosified fluid during the predetermined interval of time. The duration of the predetermined interval of time may be selectively altered, that is to say increased or decreased, depending upon the relative proportions of peroxygen compound, inhibitor and catalyst present in the viscosity breaking composition. For example, increasing the predetermined interval of time would allow the viscosified fluid to remain in a high viscosity state for a relatively longer period of time, thereby allowing the viscosified fluid to travel further after being introduced underground prior to breaking. Alternatively, decreasing the predetermined interval of time would reduce the distance traveled by the viscosified fluid prior to breaking. Accordingly, control of the predetermined interval of time allows one to regulate the distance traveled by the viscosified fluid. Finally after the predetermined interval of time has elapsed and the viscosity breaking composition has converted the viscosified fluid to a reduced viscosity fluid, the reduced viscosity fluid is extracted, at block 110.

By way of illustrative example, the viscosity breaking composition of one embodiment of the present invention may be made by first dissolving a volume of peroxygen in a volume of water and then adding a volume of one or more peroxygen stabilizing agents, i.e. inhibitor, to the mixture of peroxygen and water, such that the resulting solution has a peroxygen stabilizing agent concentration of between 0.01% and 30% by weight. In one embodiment the, peroxygen stabilizing agent may include a combination of phosphoric acid and sodium stannate. The concentration of the peroxygen stabilizing agent is determined according to the desired breaking speed/time, such that a larger concentration of peroxygen stabilizing agent will result in a larger predetermined interval of time in which breaking of the viscosified fluid occurs. Similarly, the relative concentration of the peroxygen contained in viscosity breaking composition will vary according to the peroxygen selected. For example, an embodiment of the present invention including a peroxygen component of hydrogen peroxide has a preferred concentration of hydrogen peroxide in solution of between 1.0% to 70.0% by weight. This concentration may depend on the practicality of material handling. Alternatively, in an embodiment of the present invention in which the peroxygen component is sodium persulfate, the concentration of sodium persulfate is preferably between 0.1% to 35% by weight. After the peroxygen component and the peroxygen stabilizing agents, i.e. inhibitor, have been combined, the peroxygen catalyzing agent, i.e. initiator, is added to form the viscosity breaking composition. In one embodiment, the peroxygen catalyzing agent is an aqueous solution of ferric methylglycine diacetate (Ferric MGDA) having a preferred concentration of between 0.0001% to 5.0% by weight. In one preferred embodiment, the peroxygen catalyzing agent may be added directly to the viscosified fluid which may or may not contain proppants after viscosifier hydration, and then the stabilized peroxygen mixture, including both the peroxygen component and the peroxygen stabilizing agent, is subsequently added independently to the resultant mixture of viscosified fluid and peroxygen catalyzing agent. In this embodiment the stabilized peroxygen mixture may be added at a rate of 0.0001 to 3 units per 1 unit of viscosified fluid, i.e. 0.0001 to 3 gallons per 1000 gallons of viscosified fluid. Resultantly, the viscosity breaking composition, including the peroxygen component, peroxygen stabilizing agent and peroxygen catalyzing agent are not independently combined together in solution until they are added to the viscosified fluid, as described above in block 102 of method 100. However, other methods of combining or mixing the viscosity breaking composition, including the peroxygen component, peroxygen stabilizing agent and peroxygen catalyzing agent are considered within the scope of this invention.

Addition of the peroxygen catalyzing agent, i.e. initiator, may be achieved by any number of methods including using metering pumps in order to add specific concentrations in the viscosified fluids as they are being injected into the subsurface. Alternatively, the peroxygen catalyzing agent can be poured or transferred directly into containers of high viscosity fluids such as frac tanks, storage tanks, hydration mixers, etc. In this embodiment, mixing of the peroxygen catalyzing agent with the viscosified fluid may be achieved by any number of static or mechanical mixing methods.

The viscosified fluids, to which the viscosity breaking composition is combined at block 102, may consist of any solution prepared by adding a quantity of a viscosifier, such as but not limited to polyacrylamide, xanthan gum, guar, to a given amount of water. This water dilutent can be fresh water or a brine solution made from any number of salts such as sodium chloride, calcium chloride, potassium chloride, seawater, produced water or others.

The predetermined interval of time, during which the viscosity of the viscosified fluid is reduced in block 108 of method 100, is the reaction time of the viscosity breaking composition. The predetermined interval of time can be increased, i.e., the reaction time can be delayed, by manipulating the relative amount of peroxygen stabilizing agent, i.e. inhibitor, present in the viscosity breaking composition. Absence of the inhibitor from the viscosity breaking composition will allow a break to occur in as little as 30 seconds using a catalyzed hydrogen peroxide system, according to one embodiment of the present invention, while the addition of 4% to 7% by weight of inhibitor to the hydrogen peroxide solution can delay the reaction for more than 24 hours. Accordingly, in a one embodiment the predetermined interval of time is approximately between 1.0 minutes and 5 days; and in a preferred embodiment the predetermined interval of time is approximately between 1.0 minutes and 2,880 days. However, any predetermined interval of time between 1.0 minutes and 5 days is considered within the scope of this invention.

As was previously discussed, in one preferred embodiment the peroxygen inhibitor can be added to the peroxygen to create a stabilized peroxygen solution prior to arrival at the well site. Alternatively, a volume of the peroxygen inhibiting agent can be added and to and mixed with a volume of peroxygen compound in fluid tanks located site to create a stabilized peroxygen solution. In yet another embodiment, the volume of the peroxygen inhibiting agent can be added to the volume of peroxygen compound as the peroxygen is introduced into the viscosified fluid, prior to injection into the subsurface. The peroxygen inhibitor may also be added directly to the viscosified fluid before or after the peroxygen is added to the viscosified fluid. Mixing of the peroxygen and peroxygen inhibitor may be achieved by any number of static or mechanical mixing methods. The resultant stabilized peroxygen mixture of peroxygen and peroxygen inhibitor will react, i.e. break the viscosified fluid, slower than a tradition peroxygen solution. This increase in the break time of the stabilized peroxygen mixture is evident by slower peroxygen decomposition rates and/or slower rates of peroxygen activation when exposed to peroxygen activators.

As was previously discussed regarding the peroxide catalyzing agent, the components of the viscosity breaking composition can be introduced in the viscosified fluids using metering pumps in order to achieve specific concentrations in the viscosified fluids injected into the subsurface. Alternatively, in another embodiment of the present invention the components of the viscosity breaking composition can be poured or transferred directly into containers of high viscosity fluids such as frac tanks or storage tanks. The components of the viscosity breaking composition are thoroughly mixed into the viscosified fluid using any number of methods including mixing chambers, mechanical mixing, or other methods of fluid mixing. In a hydraulic fracturing application, the solution containing the viscosified fluid, proppants, and viscosity breaking composition are then injected into the subsurface in order accomplish hydraulic fracturing of the subsurface formation in order to stimulate the release of any number of fluids or gasses form the subsurface formation.

The peroxygen compound of the viscosity breaking composition may include: organic peroxides, inorganic peroxides, persulfate salts, percarbonate salts, perborate salts, and combinations thereof. More specifically, the peroxygen compound may include but is not limited to tert-butyl peroxide, peracetic acid, benzoyl peroxide, cumene hydroperoxide, hydrogen peroxide, sodium peroxide, magnesium peroxide, calcium peroxide, sodium persulfate, potassium persulfate, ammonium persulfate, sodium peroxymonosulfate, potassium peroxymonosulfate, sodium percarbonate, sodium perborate and combination thereof.

The peroxygen stabilizing agent of the viscosity breaking composition may include: phosphoric acid, stannic acid, stannate, nitrates, organophosphates, phosphate salts and combinations thereof. More specifically, the peroxygen stabilizing agent may but is not limited to include sodium stannate, potassium stannate, calcium stannate, ammonium nitrate, sodium nitrate, potassium nitrate, trisodium phosphate, sodium phosphate dibasic, sodium tripolyphosphate, and combination thereof.

The peroxygen catalyzing agents of the viscosity breaking composition may include: transition metals, transition metal salts, chelated transition metals, manganese dioxide, sugars, or combinations thereof. More specifically, the peroxygen catalyzing agent may include but is not limited to iron, titanium, copper, zinc, nickel, ferric chloride, titanium chloride, cupric chloride, zinc chloride, ferric MGDA, ferric sodium EDTA, titanium (III) citrate, copper glycinate, and combinations thereof.

Turning now to FIGS. 2 through 10, various embodiments of the present invention are described below. In the following experiments, fluid viscosities were tested using a Marsh funnel. All result flow times shown FIGS. 2 through 8 were normalized using tap water as a basis. The time for water to pass through the funnel was normalized to a value of 1, depicted along the y-axis of plots 200, 300, 400, 500, 600, 700 and 800. Initial time for the viscosified fluid was normalized using the same scale, depicted along the x-axis of plots 200, 300, 400, 500, 600, 700 and 800. Temperatures were held constant throughout the test period. The viscosifying agents used were a polyacrylamide, guar, and a polyacrylamide-AMPS copolymer with minimum hydration times of 30 minutes. A 0.5% (vol/vol) viscosifying agent solution was made using a 6% (wt/wt) NaCl brine solution or tap water as the diluent.

Example 1

Figure 2:
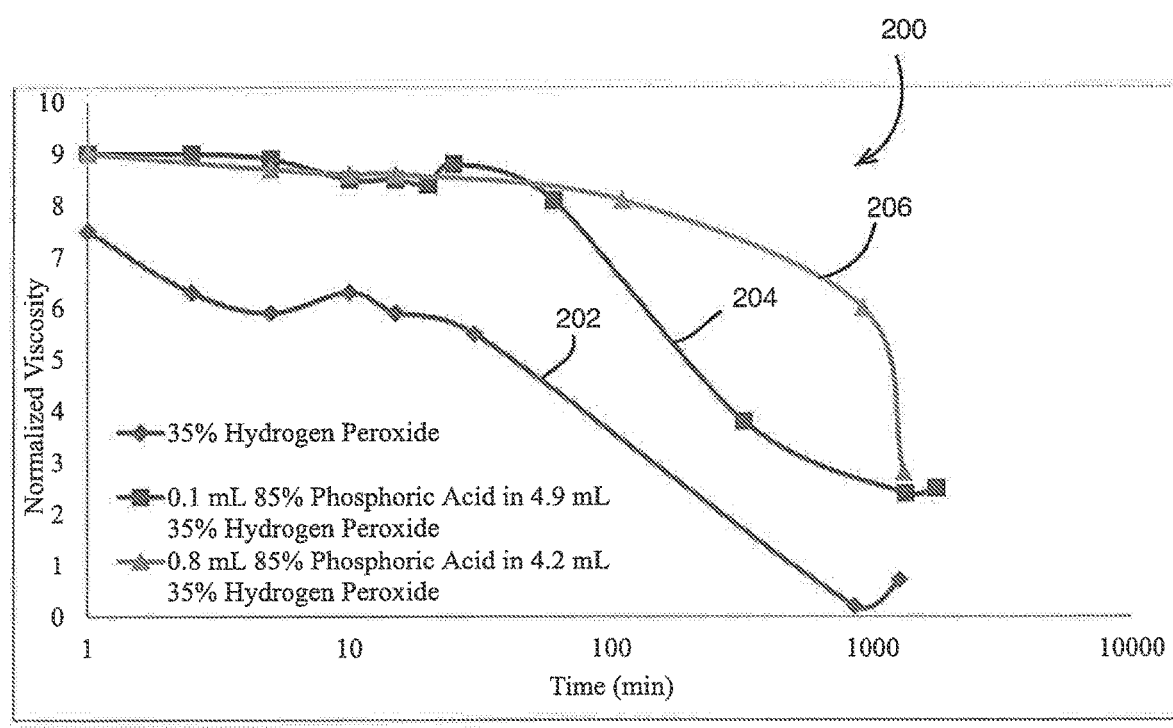
FIG. 2 is plot showing the relative normalized fluid viscosities over time of a viscosified fluid treated with three 5 mL samples of a non-catalyzed hydrogen peroxide based viscosity breaking composition, where the three samples have varying percentages of a peroxygen inhibiting agent.

Turning now FIG. 2, plot 200 shows the relative normalized fluid viscosities over time of a viscosified fluid treated with three 5 mL samples of a non-catalyzed hydrogen peroxide based viscosity breaking composition, where the three samples have varying percentages of a peroxygen inhibiting agent.

In this example, three 500 mL viscosified fluid samples composed of 0.5% (vol/vol) polyacrylamide solution were made using aqueous 6% (wt/wt) NaCl brine solution. Two stabilized hydrogen peroxide solutions were made using 32.5 mL of 35% (wt/wt) hydrogen peroxide with 1.) 6.5 mL of 85% (wt/wt) phosphoric acid or 2.) 1 mL of 85% (wt/wt) phosphoric acid. Each of the three viscosified fluid samples was dosed with 5 mL of one of the hydrogen peroxide solutions and was mixed thoroughly.

As can be seen in trend line 202 on plot 200, the viscosity of the viscosified fluid broken with 35% hydrogen peroxide alone, i.e., without a peroxygen inhibiting agent, is reduced much more quickly than either the hydrogen peroxide solution containing 0.1 mL of the peroxygen inhibiting agent phosphoric acid, identified as trend line 204, or the hydrogen peroxide solution containing 0.8 mL of the peroxygen inhibiting agent phosphoric acid, identified as trend line 206. That is to say that the predetermined interval of time described above in block 104 of method 100 is much shorter for trend line 202 than trend lines 204 and 206, respectively. The difference in the rate of viscosity reduction between the two inhibited solutions, depicted by trend lines 204 and 206, is also significant. The difference in the rate of viscosity reduction between the hydrogen peroxide treated sample 202 and two inhibited hydrogen peroxide solution treated samples 204, 206, as well as, the difference between the two inhibited hydrogen peroxide treated samples 204, 206 respectively, demonstrated the ability of a viscosity breaking composition according to the present invention to control the rate of viscosity reduction according to the relative concentrations of the peroxygen inhibiting agent to peroxygen compound.

Example 2

Figure 3:
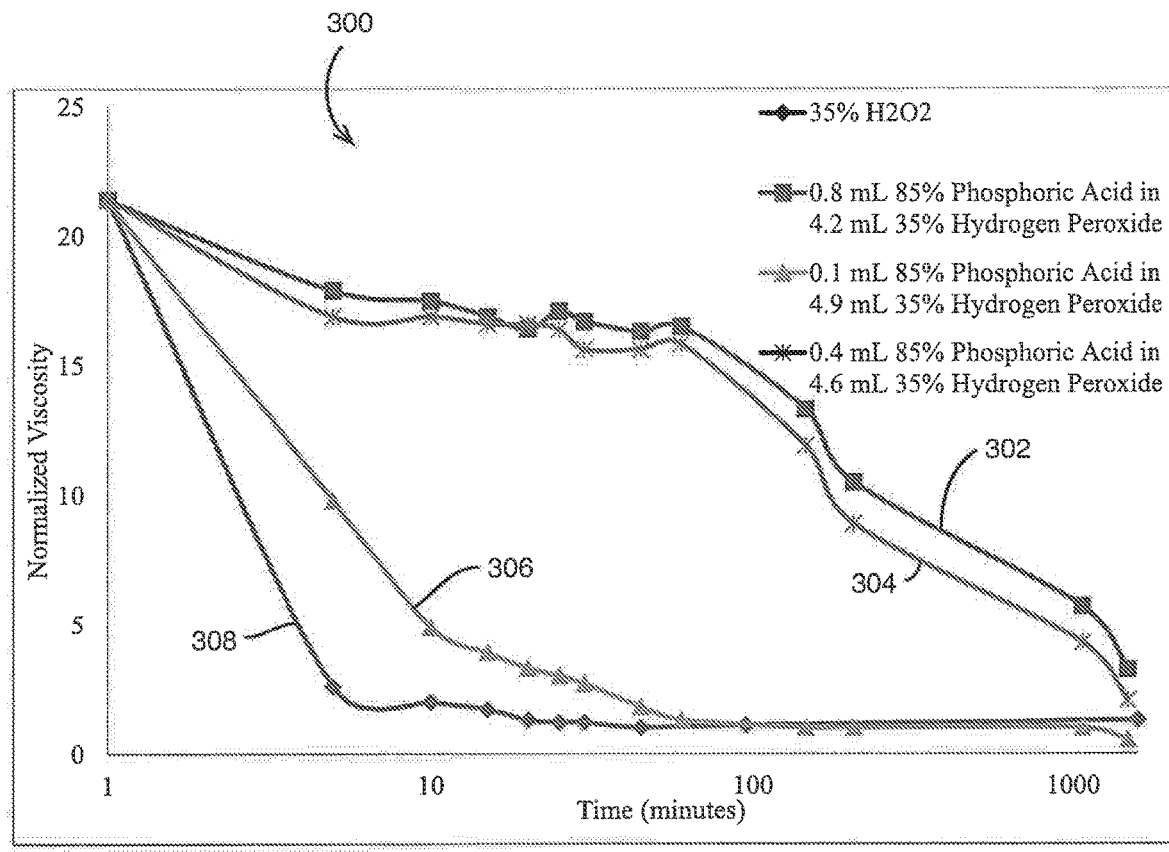
FIG. 3 is plot showing the relative normalized fluid viscosities over time of a viscosified fluid treated with four 5 mL samples of a catalyzed hydrogen peroxide based viscosity breaking composition, where the four samples have 1 mL of 22% by weight of a peroxygen catalyzing agent and the four solution have varying percentages of a peroxygen inhibiting agent.

Turning now FIG. 3, plot 300 shows the relative normalized fluid viscosities over time of a viscosified fluid treated with four 5 mL samples of a catalyzed hydrogen peroxide based viscosity breaking composition, where the four samples have 1 mL of 22% by weight of a peroxygen catalyzing agent (Ferric MGDA) and the four solution have varying percentages of a peroxygen inhibiting agent.

In this example, four 500 mL viscosified fluid samples composed of 0.5% (vol/vol) polyacrylamide solution were made using tap water. Three stabilized hydrogen peroxide solutions were made using 1.) 4.2 mL of 35% (wt/wt) hydrogen peroxide with 0.8 mL of 85% (wt/wt) phosphoric acid, 2.) 4.6 mL of 35% (wt/wt) hydrogen peroxide with 0.4 mL of 85% (wt/wt) phosphoric acid, and 3.) 4.9 mL of 35% (wt/wt) hydrogen peroxide with 0.1 mL of 85% (wt/wt) phosphoric acid. Each of the four viscosified fluid samples first received a 1 mL dose of 22% (wt/wt) Ferric MGDA and was mixed thoroughly. Then each of the four samples received a 5 mL dose of one of the hydrogen peroxide solutions and was mixed thoroughly.

Plot 300 illustrates the ability of the peroxygen inhibiting agent to inhibit the reaction of even a catalyzed peroxygen system according to the present invention. As can be seen in plot 300, the rate of viscosity reduction, and resultantly the predetermined interval of time, can be affected by the concentration of the selected inhibitor, phosphoric acid in this case. Also, the rate at which the viscosity is reduced can be controlled by the amount of the inhibitor used in the system which can be seen particularly well in the nearly parallel nature of the 0.8 mL 85% by weight phosphoric acid inhibited hydrogen peroxide solution, seen in the trend line 302, and the 0.4 mL 85% by weight phosphoric acid inhibited hydrogen peroxide solution, seen in the trend line 304. There is only a slight decrease in the rate of viscosity reduction for the 0.1 mL 85% by weight phosphoric acid inhibited hydrogen peroxide solution, seen in trend line 306, the catalyzed but uninhibited hydrogen peroxide solution, seen in trend line 308, but none the less a decrease in rate is seen.

Example 3

Figure 4:
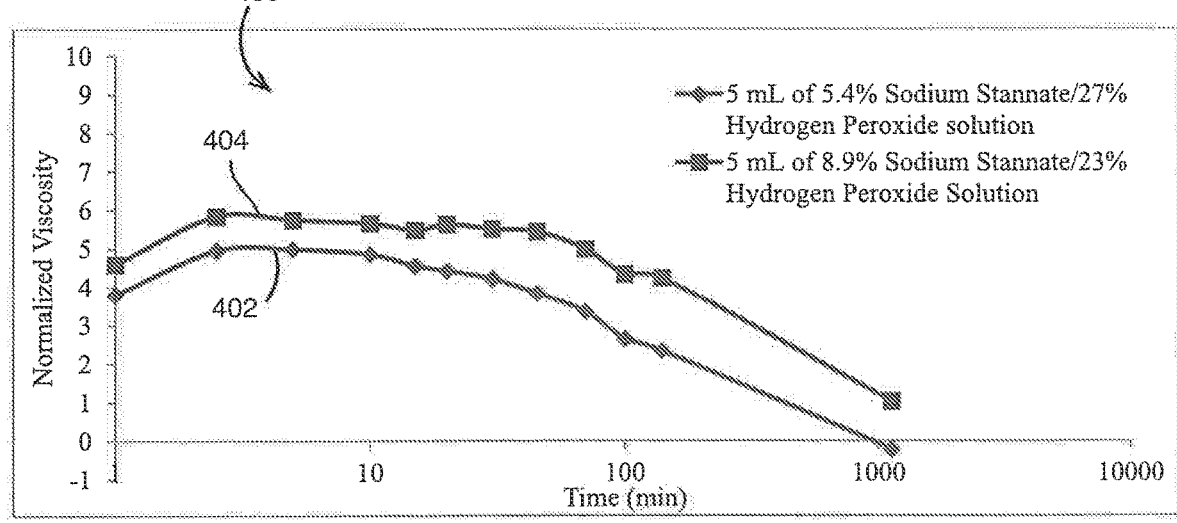
FIG. 4 is a plot showing the relative normalized fluid viscosities over time of viscosified fluid treated with two 5 mL samples of a non-catalyzed sodium stannate inhibited hydrogen peroxide based viscosity breaking composition according to the present invention, where the two samples have varying percentages of a peroxygen inhibiting agent.

Referring now to FIG. 4, plot 400 shows the relative normalized fluid viscosities over time of viscosified fluid treated with two 5 mL samples of a non-catalyzed sodium stannate inhibited hydrogen peroxide based viscosity breaking composition according to the present invention, where the two samples have varying percentages of a peroxygen inhibiting agent (sodium stannate trihydrate).

In this example, two 500 mL viscosified fluid samples composed of 0.5% (vol/vol) polyacrylamide solution were made using aqueous 6% (wt/wt) NaCl brine solution. Two stabilized hydrogen peroxide solutions were made using IS mL of 35% (wt/wt) hydrogen peroxide solution with 1.) 1.5 g sodium stannate trihydrate or 2.) 2.5 g sodium stannate trihydrate. Each of the samples received a 5 mL dose of one of the hydrogen peroxide/stannate solutions and was mixed thoroughly.

As can be seen in the trend line 402, identifying the viscosity breaking composition containing the lesser 5.4% peroxygen inhibiting agent (sodium stannate trihydrate), relative to the trend line 404, identifying the viscosity breaking composition containing the higher 8.9% peroxygen inhibiting agent (sodium stannate trihydrate), the plot 400 shows that the change in the rate of viscosity reduction is dependent on the dose rate of sodium stannate trihydrate peroxygen inhibiting agent. That is to say that a higher concentration of the sodium stannate trihydrate peroxygen inhibiting agent results in slower viscosity reduction rates.

Example 4

Figure 5:
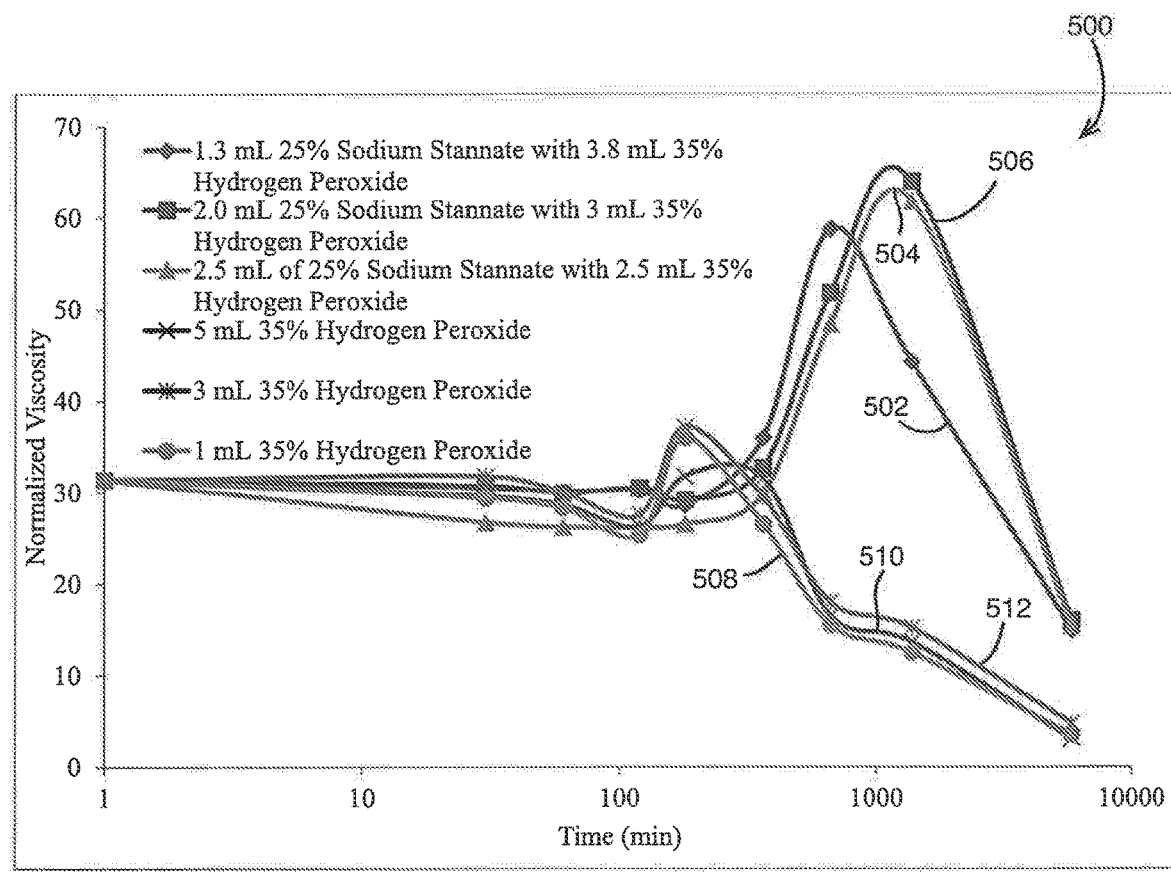
FIG. 5 is a plot showing the relative normalized fluid viscosities over time of three samples of viscosified fluid treated with non-catalyzed sodium stannate peroxygen inhibiting based viscosity breaking compositions compared to three samples of viscosified fluid treated with various volumes of non-catalyzed uninhibited hydrogen peroxide.

Turning now FIG. 5, plot 500 shows the relative normalized fluid viscosities over time of three samples of viscosified fluid treated with non-catalyzed sodium stannate peroxygen inhibiting based viscosity breaking compositions compared to three samples of viscosified fluid treated with various volumes of non-catalyzed uninhibited hydrogen peroxide.

In this example, three liters of 0.5% (vol/vol) polyacrylamide-AMPS copolymer solution were made using tap water and divided into six 500 mL samples. Three stabilized hydrogen peroxide solutions were made using 1.) 1.3 mL of 25% (wt/wt) sodium stannate and 3.8 mL of 35% (wt/wt) hydrogen peroxide, 2.) 2.0 mL of 25% (wt/wt) sodium stannate and 3.0 mL of 35% (wt/wt) hydrogen peroxide, and 3.) 2.5 mL of 25% (wt/wt) sodium stannate and 2.5 mL of 35% (wt/wt) hydrogen peroxide. Three of the 500 mL polymer solutions each received one of the three stabilized peroxide solutions described above. The other three received either 1 mL 35% (wt/wt) hydrogen peroxide, 3 mL 35% (wt/wt) hydrogen peroxide, or 5 mL 35% (wt/wt) hydrogen peroxide in order to compare viscosity reduction rates with the stannate stabilized peroxide.

As can be seen in plot 500, sodium stannate peroxygen inhibiting based viscosity breaking compositions, identified by trend lines 502, 504 and 506 respectively according to increasing inhibitor concentration, delayed the viscosity reduction of the above described polymer solution by a significant amount versus all hydrogen peroxide only doses, identified by trend lines 508, 510 and 512 respectively according to increasing volume.

As specifically regards trend lines 508, 510 and 512, the plot 500 also illustrated that the delay in viscosity reduction is not due to a reduction in available oxidant in the stabilized peroxide solutions. That is to say that the comparison of the 1 mL 35% (wt/wt) hydrogen peroxide treated polymer solution, identified by trend line 508, to the 2.5 mL 25% (wt/wt) sodium stannate with 2.5 mL 35% (wt/wt) hydrogen peroxide treated polymer solution, identified by trend line 504, shows that at less than half of the hydrogen peroxide added versus the lowest stabilized hydrogen peroxide solution, the 1 mL hydrogen peroxide treated sample (trend line 508) shows a reduction in viscosity that is very similar to that of the 3 mL and 5 mL hydrogen peroxide treated samples (trend lines 510 and 512).

Example 5

Figure 6:
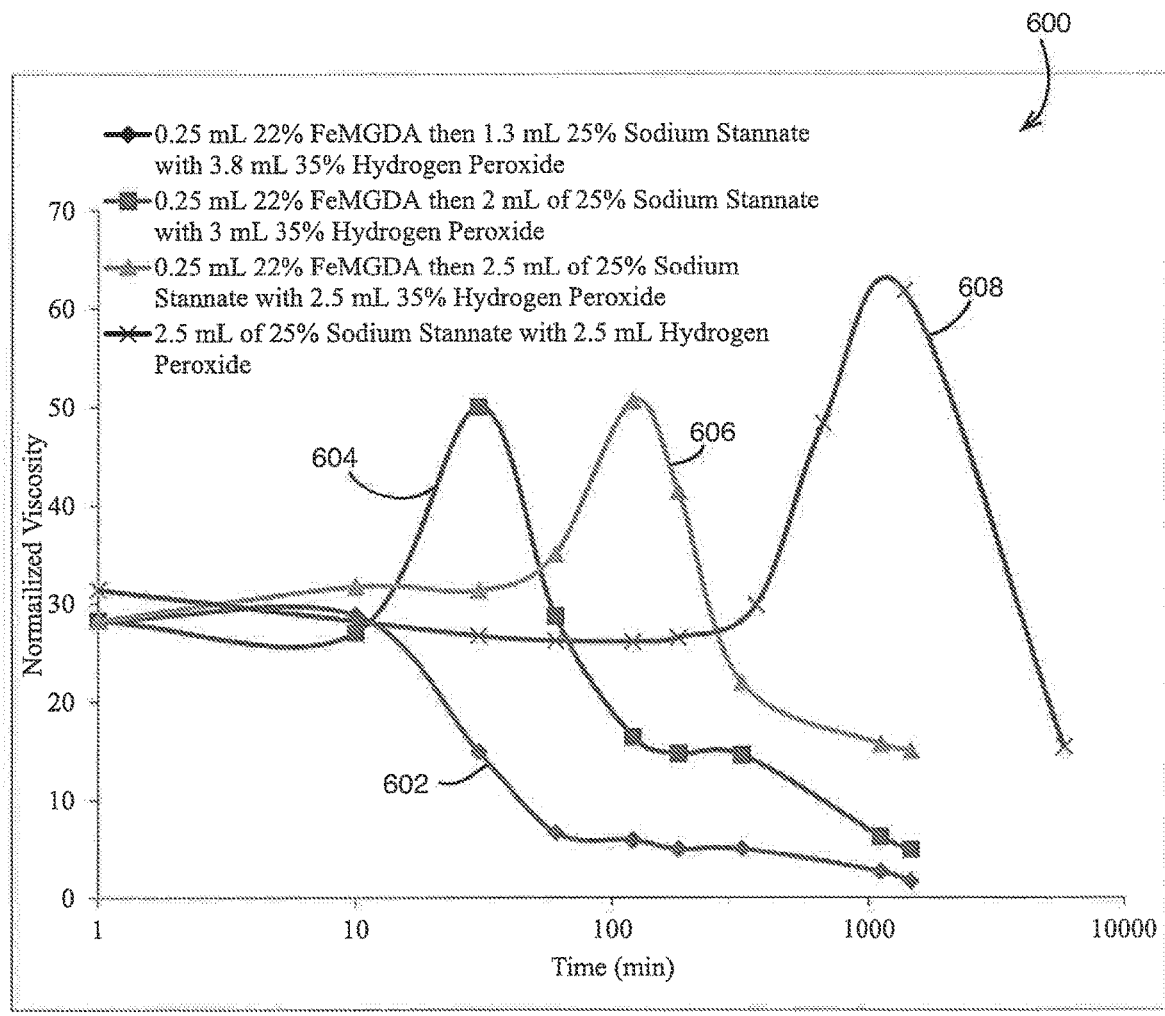
FIG. 6 is a plot showing the relative normalized fluid viscosities over time of three samples of viscosified fluid treated with a hydrogen peroxide based viscosity breaking composition including 0.25 mL of 22% by weight ferric methylglveine diacetate ("AMU") catalyzing agent and various volumes of 25% by weight sodium stannate inhibiting agent as compared to non-catalyzed sodium stannate inhibited hydrogen peroxide based viscosity breaking composition.

Turning now FIG. 6, plot 600 shows the relative normalized fluid viscosities over time of three samples of viscosified fluid treated with a hydrogen peroxide based viscosity breaking composition including 0.25 mL of 22% by weight FeMGDA catalyzing agent and various volumes of 25% by weight sodium stannate inhibiting agent as compared to non-catalyzed sodium stannate inhibited hydrogen peroxide based viscosity breaking composition.

In this example, one and a half liters of 0.5% (vol/vol) polyacrylamide-AMPS copolymer solution was made using tap water and was divided into three 500 mL samples. Three stabilized hydrogen peroxide solutions were made as described in Example 4. 0.25 mL of 22% (wt/wt) FeMDGA were added to each of the three 500 mL polymer solution samples and mixed thoroughly. Then each of the three polymer solutions received one of the three sodium stannate stabilized hydrogen peroxide solutions.

Plot 600 illustrates the ability of the viscosity breaking composition including a 22% by weight FeMGDA catalyzing agent to speed the viscosity reduction of sodium stannate inhibited hydrogen peroxide solutions, according to an embodiment of the present invention as seen in the relative trend lines 602, 604 and 606 which correspond to increasing concentrations of the sodium stannate inhibiting agent. It is also noted that the viscosity data for the sample of 2.5 mL of 25% by weigh sodium stannate with 2.5 mL of 35% (wt/wt) hydrogen peroxide treated polymer solution, identified by trend line 608, is also included on the graph, and demonstrates a slower viscosity reduction than trend lines 602, 604 and 606.

Example 6

Figure 7:
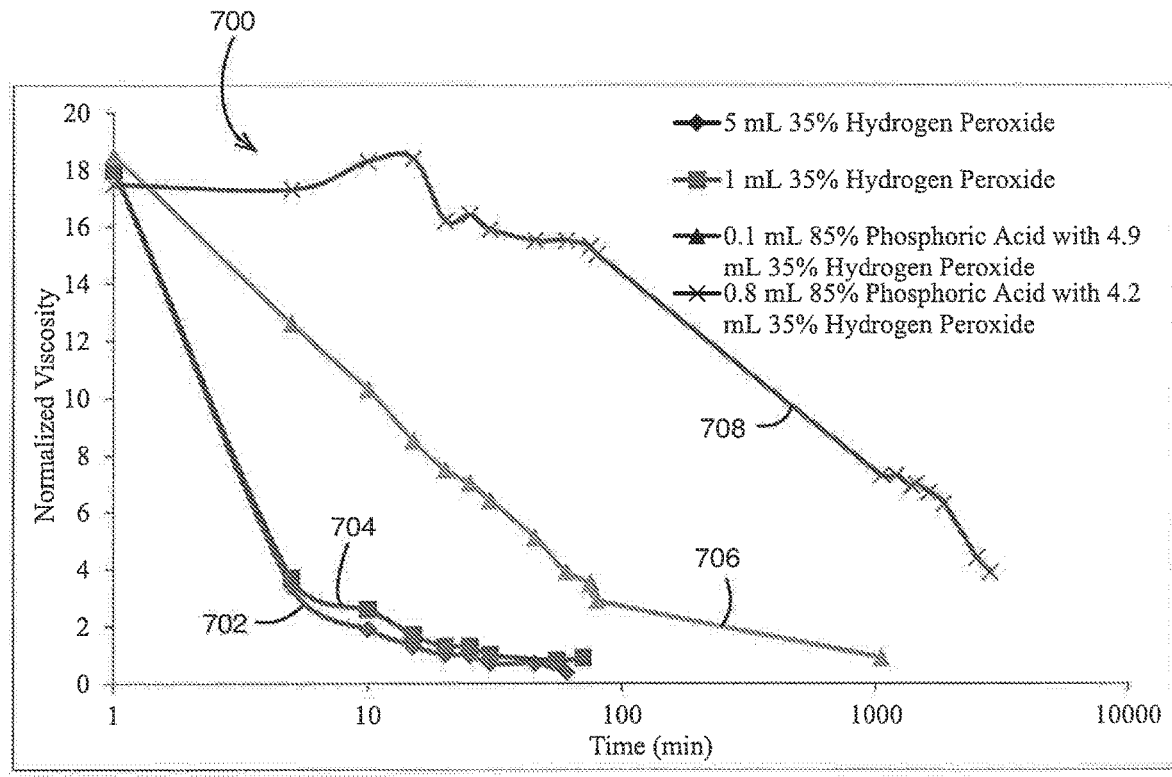
FIG. 7 is plot showing the relative normalized fluid viscosities over time of two samples of gaur based viscosified fluid treated with a hydrogen peroxide based viscosity breaking composition including 0.25 mL of 22% by weight FeMGDA catalyzing agent and variable volumes of 85% by weight phosphoric acid inhibiting agent as compared to two samples of FeMGDA catalyzed, non-inhibited hydrogen peroxide based viscosity breaking composition.

Referring now to FIG. 7, plot 700 shows the relative normalized fluid viscosities over time of two samples of gar based viscosified fluid treated with a hydrogen peroxide based viscosity breaking composition including 0.25 mL of 22% by weight FeMGDA catalyzing agent and variable volumes of 85% by weight phosphoric acid inhibiting agent as compared to two samples of FeMGDA catalyzed, non-inhibited hydrogen peroxide based viscosity breaking composition.

In this example, two liters of 0.5% (wt/wt) guar solution were made using tap water and divided into four 500 mL samples. Two stabilized hydrogen peroxide solutions were made using 1.) 0.1 mL of 85% (wt/wt) phosphoric acid with 4.9 mL of 35% (wt/wt) hydrogen peroxide and 2.) 0.8 mL of 85% (wt/wt) phosphoric acid with 4.2 mL of 35% (wt/wt) hydrogen peroxide. 0.25 mL of 22% (wt/wt) FeMGDA were added to each of the four guar solutions. Each of the stabilized, i.e. inhibited, hydrogen peroxide solutions described above was added to one of the guar samples respectively. One of the non-inhibited guar solution samples received a 1 mL dose of 35% (wt/wt) hydrogen peroxide solution while the other non-inhibited received a 5 mL dose of 35% (wt/wt) hydrogen peroxide solution.

Plot 700 shows that while the 5 mL and 1 mL FeMGDA catalyzed, non-inhibited hydrogen peroxide based viscosity breaking compositions, identified by trend lines 702 and 704 respectively resulted in shortest duration reduction of viscosity in the gar based viscosified fluid, the FeMGDA catalyzed, inhibited hydrogen peroxide based viscosity breaking compositions containing 0.1 mL and 0.8 mL of phosphoric acid peroxygen inhibitor agent, identified as trend lines 706 and 708, respectively, also resulted in proportion reductions in the viscosity of the gar based viscosified fluid. Accordingly, the FeMGDA catalyzed, phosphoric acid inhibited hydrogen peroxide based viscosity breaking compositions performed equally well with guar based viscosified fluids as it did with polyacrylamide and polyacrylamide-AMPS copolymer based viscosified fluids discussed above in examples 1-5.

Example 7

Figure 8:
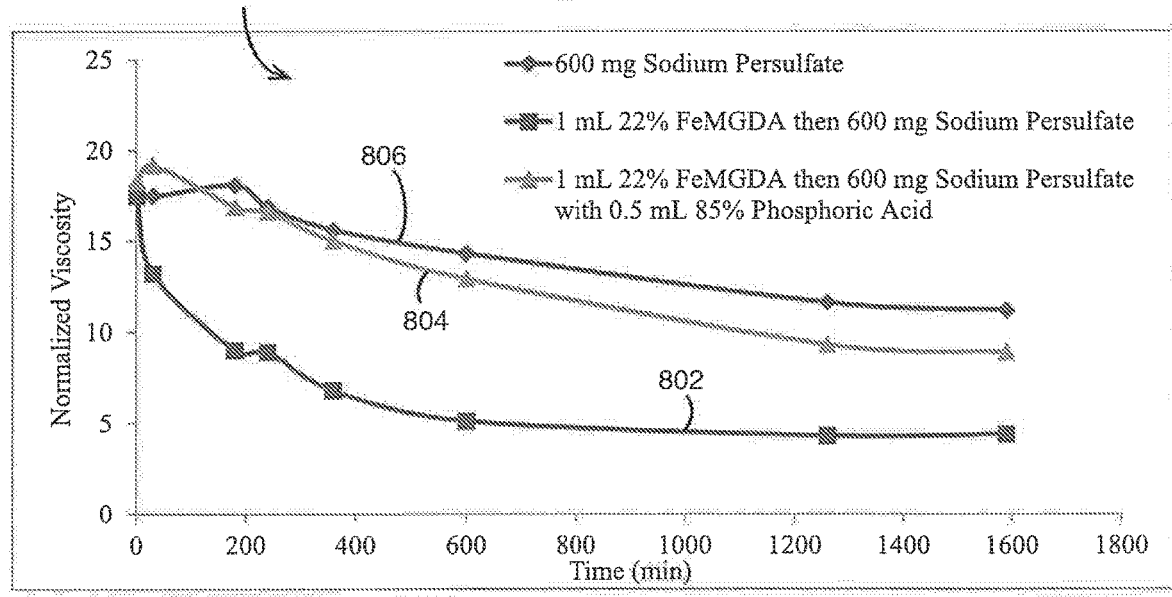
FIG. 8 is a plot showing the relative normalized fluid viscosities over time of a gaur based viscosified fluid treated with one sample of a non-catalyzed, non-inhibited sodium persulfate viscosity breaking composition, one sample of a non-inhibited sodium persulfate based viscosity breaking composition including 1.0 mL of 22% by weight FeMGDA catalyzing agent and one sample of a sodium persulfate based viscosity breaking composition including 1.0 mL of 22% by weight FeMGDA catalyzing agent and 0.5 mL of 85% by weight of a phosphoric acid peroxygen inhibiting agent.

Referring now to FIG. 8, plot 800 shows the relative normalized fluid viscosities over time of a gaur based viscosified fluid treated with one sample of a non-catalyzed, non-inhibited sodium persulfate viscosity breaking composition, one sample of a non-inhibited sodium persulfate based viscosity breaking composition including 1.0 mL of 22% by weight FeMGDA catalyzing agent and one sample of a sodium persulfate based viscosity breaking composition including 1.0 mL of 22% by weight FeMGDA catalyzing agent and 0.5 mL of 85% by weight of a phosphoric acid peroxygen inhibiting agent.

In this example, one and a half liters of 0.5% (wt/wt) guar solution were made using tap water and divided into three 500 mL samples. Three sodium persulfate solutions were made, two using 1.) 600 mg sodium persulfate in 5 mL distilled water, and one using 2.) 600 mg sodium persulfate in 5 mL distilled water with 0.5 mL 85% (wt/wt) phosphoric acid.

Plot 800 shows the ability of both the FeMGDA peroxygen catalyzing agents, shown in the samples identified by trend lines 802 and 804, as well as the phosphoric acid inhibiting agent, shown in the sample identified as trend line 804, to be effectively used with a sodium persulfate based peroxygen component of a viscosity breaking composition. As can be seen, isolated peroxygen component sodium persulfate will reduce the viscosity of the guar solution, as shown by trend line 806. When combined with 22% by weight FeMGDA peroxygen catalyzing agent, the viscosity can be reduced much more quickly, as seen in trend line 802. When 85% by weight phosphoric acid is used to stabilize, i.e. inhibit, the sodium persulfate component, the length of time to reduce the viscosity of the gaur solution is increased, as seen in trend line 804, but the rate is still faster than sodium persulfate alone.

Example 8

Figure 9:
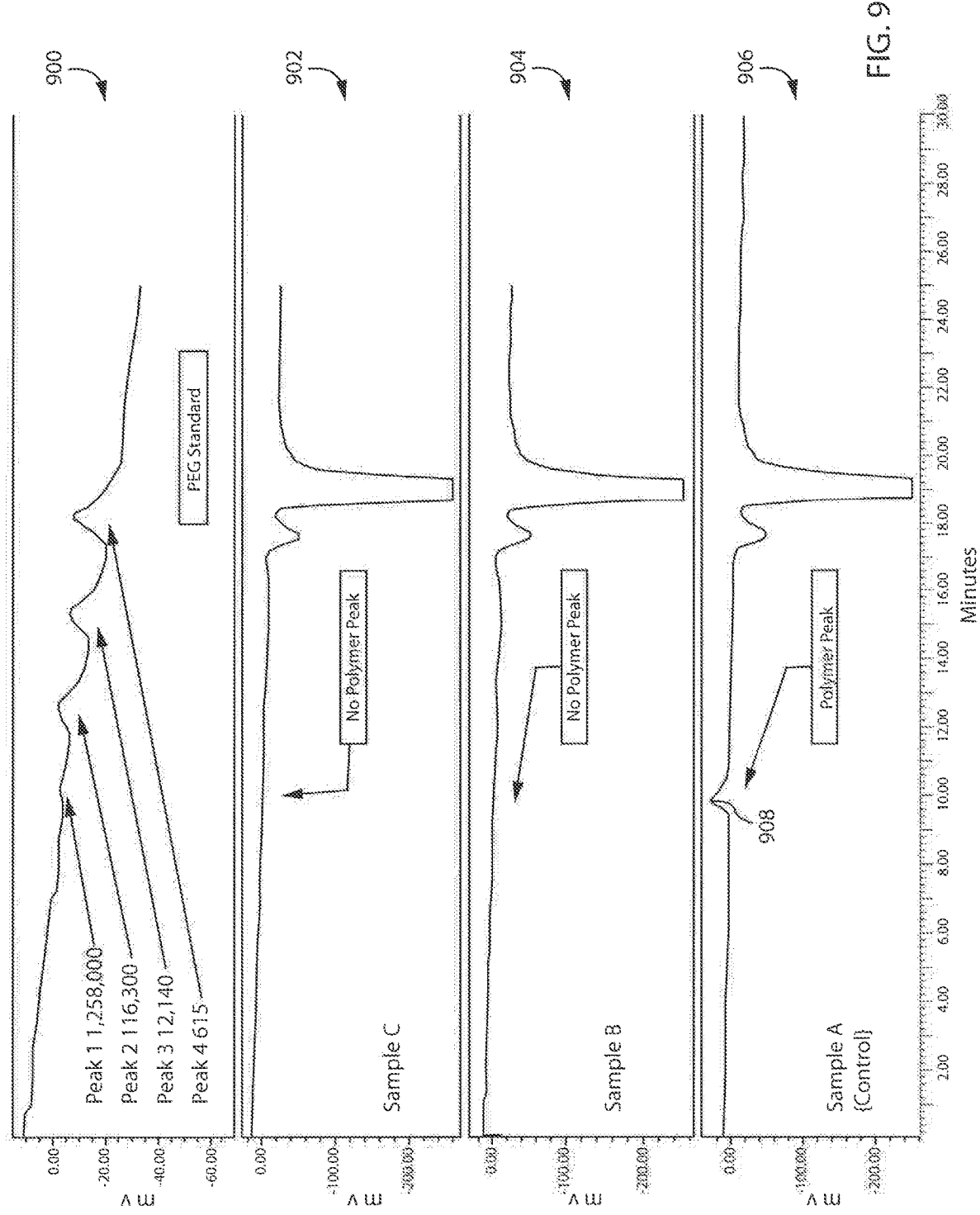
FIG. 9 is four chromatogram plots depicting the results of performing a gel permeable chromatograph analysis of a reference polyethylene glycol standard, a control polyacrylamide solution, a first treated polyacrylamide solution, and a second treated polyacrylamide solution, in accordance with one embodiment of the invention.

Referring now to FIG. 9, four chromatograms 900, 902, 904, and 906 are shown as the results of performing a gel permeable chromatograph (GPC) analysis of a reference polyethylene glycol standard shown in chromatograph 900, a control polyacrylamide solution identified as "Sample A (Control)" shown in chromatograph 906, a treated polyacrylamide solution identified as "Sample B" shown in chromatograph 904, and a treated polyacrylamide solution identified as "Sample C" shown in chromatograph 902.

FIG. 9 illustrates the change in molecular weight detected using a gel permeable chromatograph (GPC). In this example, a control polyacrylamide solution was created by diluting a polyacrylamide with tap water. Treatments B and C were conducted using a non-inhibited, Fe-MGDA catalyzed peroxide viscosity breaking composition applied to a viscosified fluid. A reference standard using polyethylene glycol was utilized to illustrate the molecular weight ranges of the polyacrylamide solutions. Units measured in Daltons.

Unlike the peak 908, which is present in the a control polyacrylamide solution identified as "Sample A (Control)" shown in chromatograph 906, no corresponding peak appears in either the treated polyacrylamide solution identified as "Sample B" shown in chromatograph 904, or the treated polyacrylamide solution identified as "Sample C" shown in chromatograph 902.

Example 9

Figure 10:
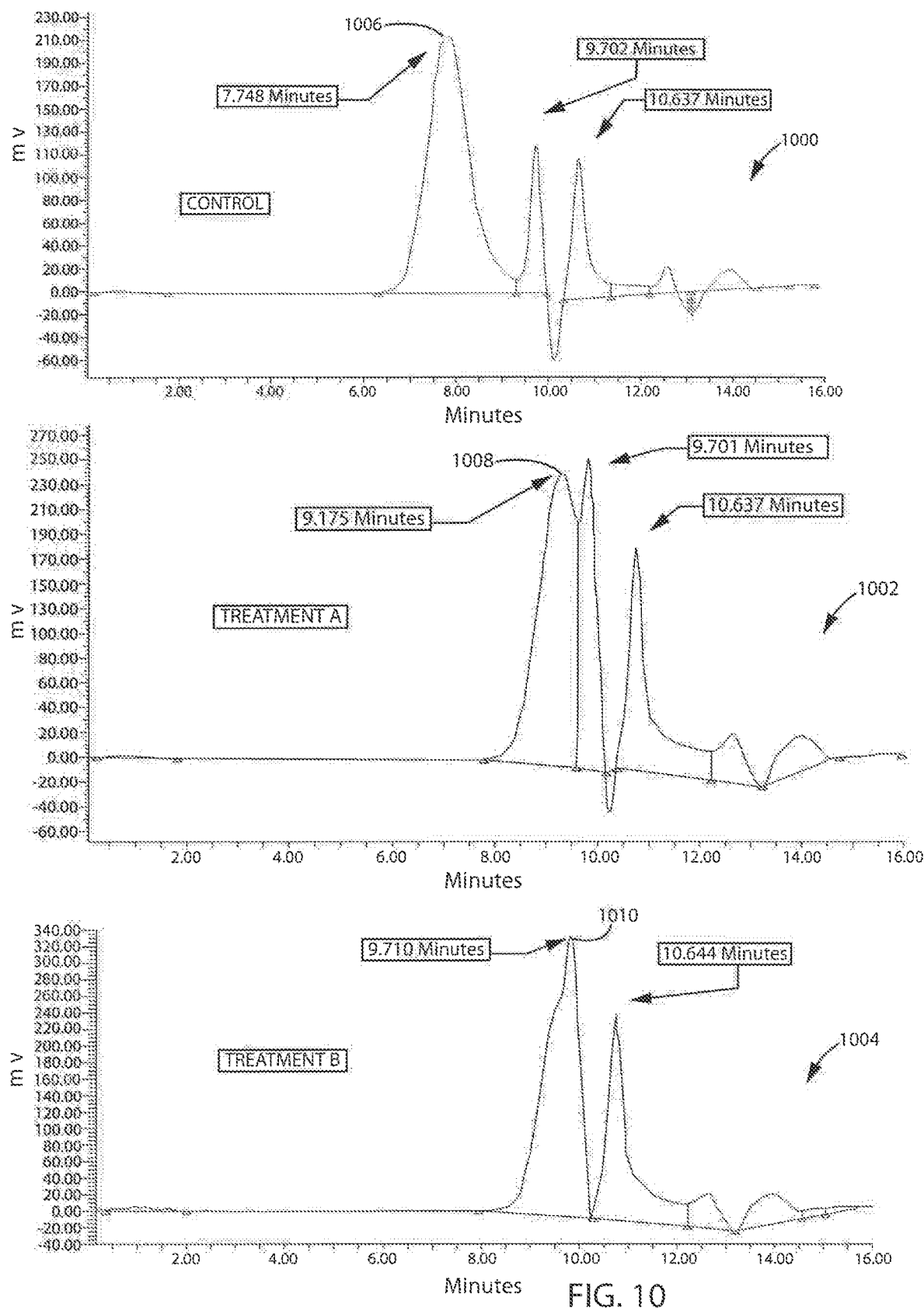
FIG. 10 is three chromatogram plots depicting the results of performing a gel permeable chromatograph analysis of a control polyacrylamide solution, a polyacrylamide solution identified as "treatment a", and a polyacrylamide solution identified as "treatment b," in accordance with one embodiment of the invention.

Referring now to FIG. 10, three chromatograms 1000, 1002, and 1004 are shown as the results of performing a gel permeable chromatograph (GPC) analysis of a control polyacrylamide solution, a polyacrylamide solution identified as "Treatment A", and a polyacrylamide solution identified as "Treatment B".

FIG. 10 illustrates the change in molecular weight detected using a gel permeable chromatograph. In this example, a control polyacrylamide solution, identified as "CONTROL" and depicted in chromatogram 1000 was created by diluting a polyacrylamide with tap water. Treatments A and B were conducted using a non-inhibited, Fe-MGDA catalyzed peroxide viscosity breaking composition applied to a viscosified fluid. The shift in the time of the primary polymer peak from 7.748 minutes, identified as peak 1006 in control chromatograph 1000, to 9.175 minutes in Treatment A, identified as peak 1008 in control chromatograph 1002, and 9.710 minutes in Treatment B, identified as peak 1010 in control chromatograph 1004, demonstrates a reduction in the molecular weight of the original polyacrylamide solution contained within the viscosified fluid, i.e., the "Control".

The viscosity measurements of Table 1, below, illustrates viscosity reductions achieved using the non-inhibited hydrogen peroxide based viscosity breaking composition catalyzed by a volume of Fe-MGDA in accordance with one embodiment of the present invention. As demonstrated by the following table, concentrations of individual components, such as peroxygen component and peroxygen catalyzing agent can be manipulated in order to achieve a desired final viscosity value.

TABLE 1

| Friction Reducer | Peroxide Component Dose (gal./1,000) | Activator (Fe-MGDA Catalyzing Agent) Dose (gal/1,000) | Beginning Viscosity (CPS) | Final Viscosity (CPS) |
| --- | --- | --- | --- | --- |
| Polyacrylamide Based Gel Water | 0.25 | 0.25 | 779 | 4.56 |
| Polyacrylamide Based Gel Water | 0.5 | 0.5 | 779 | 3.78 |

TABLE 1-continued

| Friction Reducer | Peroxide Component Dose (gal./1,000) | Activator (Fe-MGDA Catalyzing Agent) Dose (gal/1,000) | Beginning Viscosity (CPS) | Final Viscosity (CPS) |
|---|---|---|---|---|
| Polyacrylamide Based Gel Water | 1.0 | 1.0 | 779 | 4.2 |
| Polyacrylamide Based Gel Water | 2.0 | 2.0 | 779 | 7.6 |
| Polyacrylamide Based Gel Water | 3.0 | 3.0 | 779 | 3.84 |
| Polyacrylamide Based Gel Water | 4.0 | 4.0 | 779 | 4.26 |
| Polyacrylamide Based Gel Water | 0.063 | 0.063 | 70.2 | 5.82 |
| Polyacrylamide Based Gel Water | 0.125 | 0.125 | 70.2 | 4.32 |
| Polyacrylamide Based Gel Water | 0.25 | 0.25 | 70.2 | 3.72 |
| Polyacrylamide Based Gel Water | 0.5 | 0.5 | 70.2 | 3.72 |
| Polyacrylamide Based Gel Water | 0.75 | 0.75 | 70.2 | 3.60 |
| Polyacrylamide Based Gel Water | 1.0 | 1.0 | 70.2 | 3.96 |
| Polyacrylamide Based Gel Water | 1.5 | 1.5 | 70.2 | 3.42 |
| Polyacrylamide Based Slick Water | 0.25 | 0.25 | 7.00 | 3.78 |
| Polyacrylamide Based Slick Water | 0.5 | 0.5 | 7.00 | 3.78 |
| Polyacrylamide Based Slick Water | 1.0 | 1.0 | 7.00 | 3.60 |
| Polyacrylamide Based Slick Water | 2.0 | 2.0 | 7.00 | 3.78 |
| Polyacrylamide Based Slick Water | 3.0 | 3.0 | 7.00 | 3.48 |
| Polyacrylamide Based Slick Water | 4.0 | 4.0 | 7.00 | 3.45 |
| Polyacrylamide Based Slick Water | 0.0 | 0.0 | 7.00 | 7.00 |

It should be understood that the invention is not limited in its application to the details of construction and arrangements of the components and method steps set forth herein. The invention is capable of other embodiments and of being practiced or carried out in various ways by those skilled in the art. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A time delayed viscosity breaking composition for reducing a molecular weight of polymers in a viscosified fluid, the composition in a first configuration comprising:
   a stabilized intermediate inhibitor mixture formed from a combination of a first volume of a peroxygen compound, a second volume of a peroxygen inhibiting agent and a third volume of a peroxygen catalyzing agent;
   the first volume of the peroxygen compound comprising a peroxide;
   the second volume of the peroxygen inhibiting agent comprising a phosphate, wherein the stabilized intermediate inhibitor mixture is formed of between 0.5% and 10.0% by weight of the second volume of the peroxygen inhibiting agent;
   the third volume of the peroxygen catalysing agent comprising a ferric methylglycine diacetate; and
   wherein a relative ratio of the first and second volumes determine a time delay for reducing the molecular weight of polymers in the viscosified fluid after introducing the stabilized intermediate inhibitor mixture into the viscosified fluid.

2. The composition of claim 1, wherein the peroxide is an organic peroxide.

3. The composition of claim 2, wherein the organic peroxide is comprised of hydrogen peroxide.

4. The composition of claim 1, wherein the phosphate is an organophosphate.

5. The composition of claim 1, wherein the phosphate is comprised of phosphoric acid.

6. The composition of claim 1, wherein the stabilized intermediate inhibitor mixture is formed of between 0.1% and 70.0% by weight of the first volume of the peroxygen compound.

7. The composition of claim 1, wherein the time delay for reducing the molecular weight of polymers in the viscosified fluid falls within a range between 1.0 minutes and 2,880 minutes.

8. The composition of claim 1, wherein the relative ratio of the third volumes to a volume of the viscosified fluid determines the time delay for reducing the molecular weight of polymers in the viscosified fluid after introducing the viscosity breaking composition to the viscosified fluid.

9. The composition of claim 8, wherein the peroxygen catalyzing agent is a transition metal.

10. The composition of claim 9, wherein the transition metal is a chelated transition metal.

11. The composition of claim 10, wherein the chelated transition metal comprises iron.

12. The composition of claim 8, comprising between 0.0001% and 5.0% by weight of the third volume of the peroxygen catalyzing agent relative to the volume of the viscosified fluid receiving the viscosity breaking composition.

13. A time delayed viscosity breaking composition for reducing a molecular weight of polymers in a viscosified fluid, the composition in a first configuration comprising:
   a stabilized intermediate inhibitor mixture formed from a combination of a first volume of a peroxygen compound and a second volume of a peroxygen inhibiting agent;
   the first volume of the peroxygen compound comprising a peroxide;
   the second volume of the peroxygen inhibiting agent comprising a phosphate, wherein the stabilized intermediate inhibitor mixture is formed of between 0.5% and 10.0% by weight of the second volume of the peroxygen inhibiting agent; and,
   a third volume of a ferric methylglycine diacetate; and
   wherein a relative ratio of the first and second volumes and the relative ratio of the third volume to a volume of the viscosified fluid determines a time delay for reducing the molecular weight of polymers in the viscosified fluid after introducing the stabilized intermediate inhibitor mixture into the viscosified fluid.

* * * * *